(12) United States Patent
Suga et al.

(10) Patent No.: US 10,015,361 B2
(45) Date of Patent: Jul. 3, 2018

(54) IMAGE MEASUREMENT SHEET, IMAGE FORMING APPARATUS, AND METHOD

(71) Applicants: Tomoaki Suga, Kanagawa (JP); Satoshi Mohri, Kanagawa (JP); Hideyo Makino, Tokyo (JP); Yoshiaki Morita, Kanagawa (JP); Satoshi Nakayama, Kanagawa (JP); Takahiro Konishi, Kanagawa (JP)

(72) Inventors: Tomoaki Suga, Kanagawa (JP); Satoshi Mohri, Kanagawa (JP); Hideyo Makino, Tokyo (JP); Yoshiaki Morita, Kanagawa (JP); Satoshi Nakayama, Kanagawa (JP); Takahiro Konishi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 107 days.

(21) Appl. No.: 15/220,508

(22) Filed: Jul. 27, 2016

(65) Prior Publication Data
US 2017/0034392 A1    Feb. 2, 2017

(30) Foreign Application Priority Data

Jul. 29, 2015 (JP) ................ 2015-149790
Jul. 20, 2016 (JP) ................ 2016-142347

(51) Int. Cl.
*H04N 1/00* (2006.01)
*H04N 1/387* (2006.01)

(52) U.S. Cl.
CPC ....... *H04N 1/3875* (2013.01); *H04N 1/00005* (2013.01); *H04N 1/00015* (2013.01); *H04N 1/00034* (2013.01); *H04N 2201/0094* (2013.01)

(58) Field of Classification Search
CPC .. H04N 1/3875; H04N 1/3872; H04N 1/3873; H04N 1/00005; H04N 1/00002;
(Continued)

(56) References Cited

U.S. PATENT DOCUMENTS 5,331,380 A * 7/1994 Nasset ................. G03G 15/605
                                                               211/47
5,745,248 A * 4/1998 Nickerson ............ H04N 1/3872
                                                               358/296
(Continued)

FOREIGN PATENT DOCUMENTS

JP    2004-349982    12/2004
JP    2005-153164    6/2005
(Continued)

*Primary Examiner* — Benjamin O Dulaney
(74) *Attorney, Agent, or Firm* — Harness, Dickey & Pierce, P.L.C.

(57) ABSTRACT

An image measurement sheet for measuring an image formed on a recording medium includes a sheet having a plurality of medium scan windows used for detecting the recording medium, a plurality of image scan windows used for detecting the image formed on the recording medium, and an information scan window used for detecting imaging condition information recorded on the recording medium with the image, the plurality of medium scan windows to be corresponded to a portion of sides and a corner of the recording medium, the plurality of image scan windows to be corresponded to a portion of the image formed on the recording medium, and the information scan window to be corresponded to the imaging condition information recorded on the recording medium.

6 Claims, 10 Drawing Sheets

(58) Field of Classification Search
CPC ........... H04N 1/00015; H04N 1/00034; H04N 1/00063
See application file for complete search history.

(56) References Cited

U.S. PATENT DOCUMENTS

| | | | | |
|---|---|---|---|---|
| 6,646,765 B1* | 11/2003 | Barker | ................ | H04N 1/38 358/1.6 |
| 6,954,290 B1* | 10/2005 | Braudaway | .......... | G06K 9/3283 358/3.26 |
| 2006/0285182 A1* | 12/2006 | Suzuki | ............... | H04N 1/00002 358/532 |
| 2011/0122432 A1* | 5/2011 | Do | .................. | H04N 1/203 358/1.15 |
| 2013/0320616 A1* | 12/2013 | Nakagaki | ............... | B65H 9/004 271/227 |
| 2016/0277610 A1* | 9/2016 | Kishi | ................ | H04N 1/00705 |

FOREIGN PATENT DOCUMENTS

| JP | 2007-329568 | 12/2007 |
|---|---|---|
| JP | 2013-192014 | 9/2013 |

\* cited by examiner

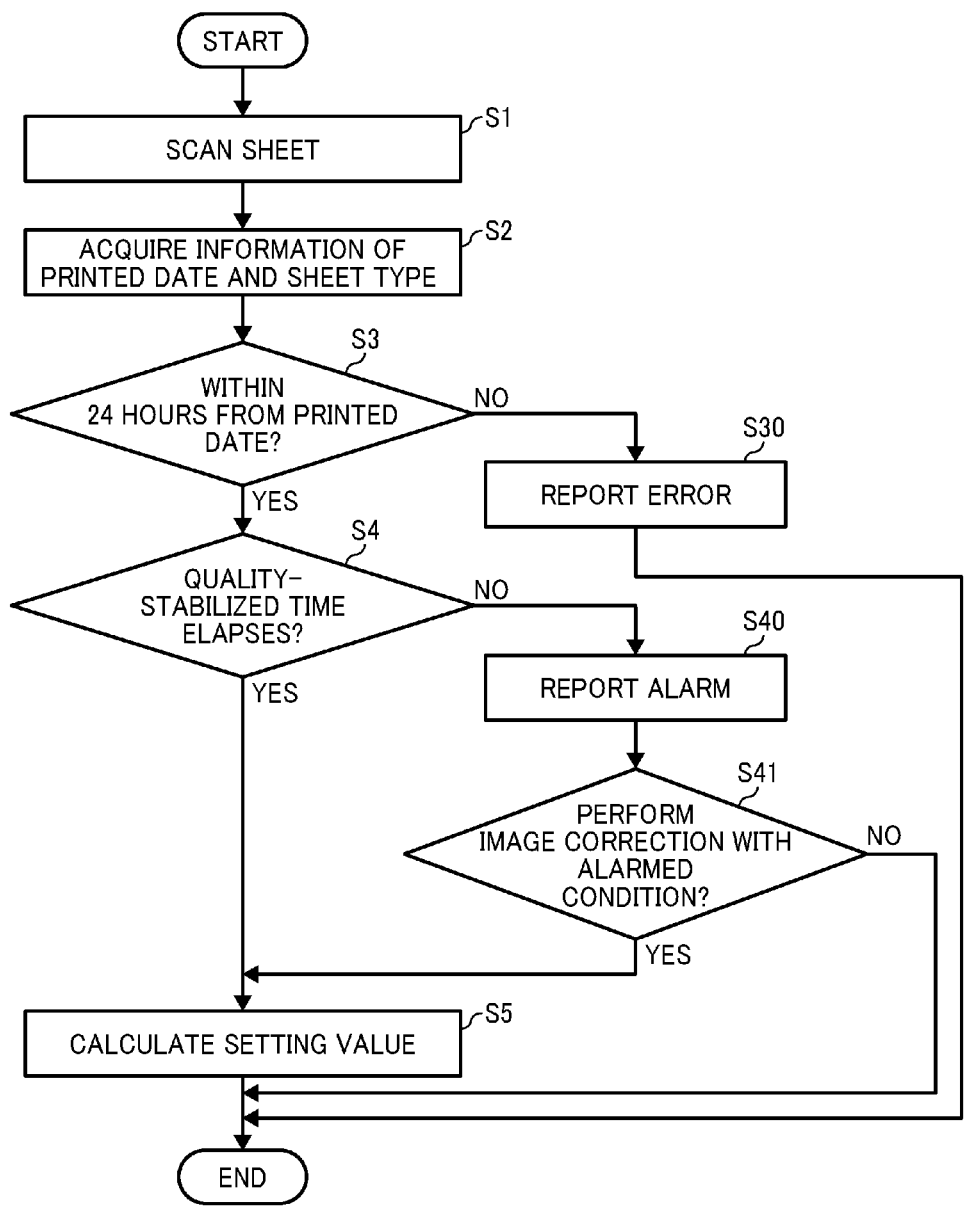

IMAGE MEASUREMENT SHEET, IMAGE FORMING APPARATUS, AND METHOD

CROSS-REFERENCE TO RELATED APPLICATION

This application claims priority pursuant to 35 U.S.C. § 119(a) to Japanese Patent Application Nos. 2015-149790, filed on Jul. 29, 2015 and 2016-142347, filed on Jul. 20, 2016 in the Japan Patent Office, the disclosure of which are incorporated by reference herein in their entirety.

BACKGROUND

Technical Field

This disclosure relates to an image measurement sheet, and an image forming apparatus using the image measurement sheet for performing an image correction, and a method using the image measurement sheet.

Background Art

Image forming apparatuses such as copiers, printers, facsimile machines and multi-functional peripherals including various image forming capabilities are used to form images on recording media. However, when an image is formed on a recording medium, the image may be deviated from a desired image, and thereby an image correction is required. The deviation from the desired image includes, for example, a positional deviation, a size deviation and an image density deviation of the image formed on the recording medium.

SUMMARY

As one aspect of the present invention, an image measurement sheet for measuring an image formed on a recording medium is devised. The image measurement sheet includes a sheet having a plurality of medium scan windows used for detecting the recording medium, a plurality of image scan windows used for detecting the image formed on the recording medium, and an information scan window used for detecting imaging condition information recorded on the recording medium with the image, the plurality of medium scan windows to be corresponded to a portion of sides and a corner of the recording medium, the plurality of image scan windows to be corresponded to a portion of the image formed on the recording medium, and the information scan window to be corresponded to the imaging condition information recorded on the recording medium.

As another aspect of the present invention, an image forming apparatus is devised. The image forming apparatus includes an image forming unit to form an image on a recording medium, an image scanning device to scan the image formed on the recording medium by overlaying an image measurement sheet on the recording medium formed with the image and through a plurality of image scan windows of the image measurement sheet, and to scan imaging condition information recorded on the recording medium by overlaying the image measurement sheet on the recording medium and through an information scan window of the image measurement sheet, and circuitry to compute an image correction condition based on the image and the imaging condition information scanned by the image scanning device, the image correction condition to be applied to a next image forming operation.

As another aspect of the present invention, a method of determining a condition of an image formed on a recording medium is devised. The method includes scanning the image formed on the recording medium, and imaging condition information including a date information indicating a date when the image is formed on the recording medium, the image condition information being recorded on the recording medium, by overlaying an image measurement sheet on the recording medium and through a plurality of image scan windows and an information scan window of the image measurement sheet, comparing the date information indicating the date when the image is formed on the recording medium and another date information corresponding to a date when the image is scanned at the scanning step, determining whether a time difference of the date information indicating the date when the image is formed on the recording medium and the another date information corresponding to the date when the image is scanned at the scanning step is greater than a given time period, and performing an image correction when the time difference is within the given time period.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 8 is a flowchart illustrating operation of determining whether an image correction is to be performed, according to an embodiment of the present invention;

Figure 1:
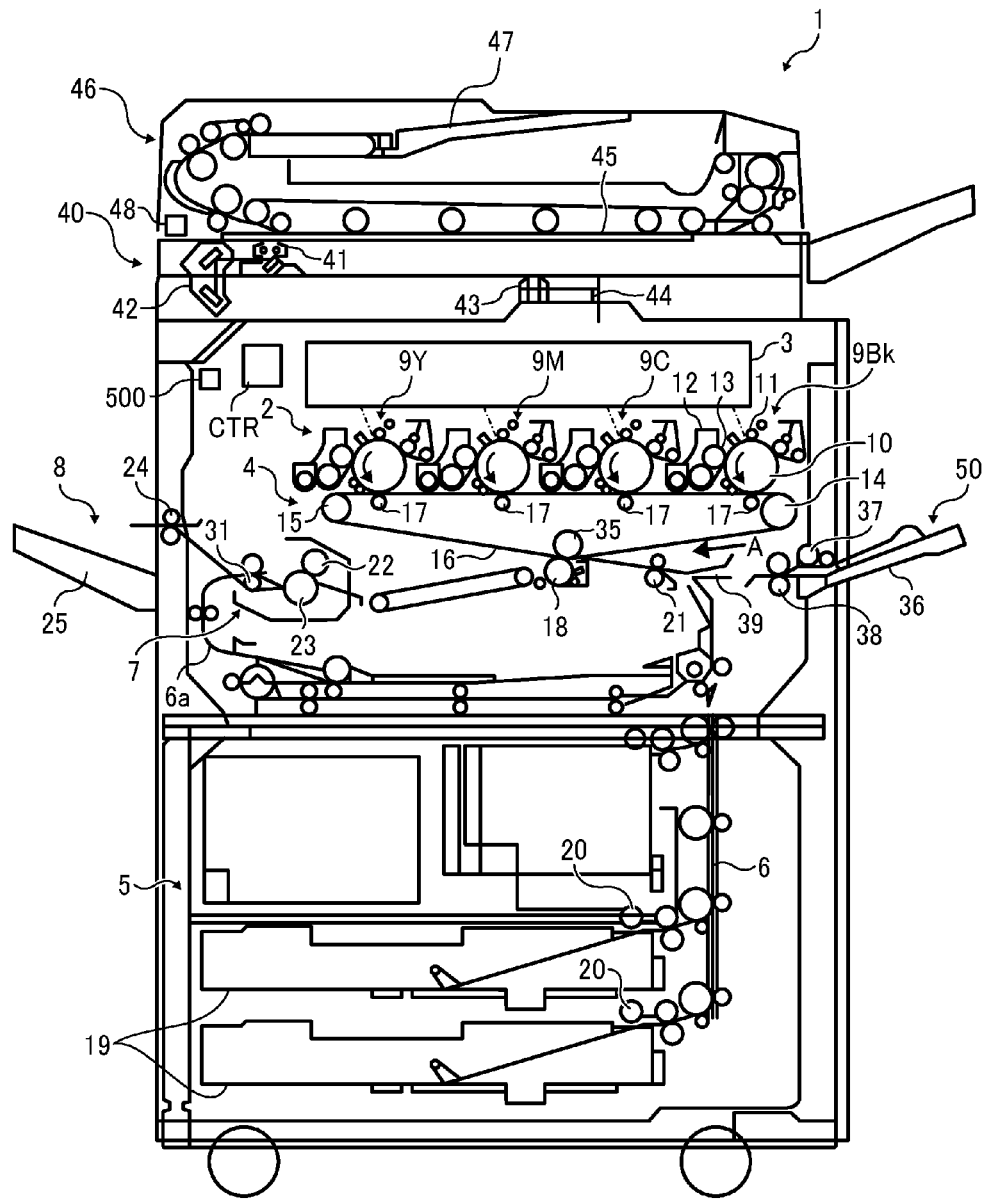
FIG. 1 is a schematic configuration of an image forming apparatus of one or more example embodiments.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views illustrated in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, one or more apparatuses or systems according to one or more example embodiments are described hereinafter.

As illustrated in FIG. 1, an image forming apparatus 1 of one or more example embodiments includes an image forming device 2 at a central section of the image forming apparatus 1. The image forming device 2 includes four process units 9Y, 9M, 9C, 9Bk detachably disposed in the image forming apparatus 1. The process units 9Y, 9M, 9C, 9Bk employ the same configurations except the color of developer used for each of the process units 9Y, 9M, 9C, 9Bk to form different color images such as images of yellow (Y), magenta (M), cyan (C), and black (Bk).

Each of the process units 9 includes, for example, a photoconductor drum 10, a charge roller 11, and a developing device 12. The photoconductor drum 10 is a rotatable drum that can carry toner used as developer on the surface of the photoconductor drum 10. The charge roller 11 uniformly charges the surface of the photoconductor drum 10. The developing device 12 includes a development roller 13 that supplies toner on the surface of the photoconductor drum 10.

An exposure unit 3 is disposed above the process units 9Y, 9M, 9C, 9Bk. The exposure unit 3 emits laser light based on image data.

A transfer unit 4 is disposed below the image forming device 2. The transfer unit 4 includes, for example, a drive roller 14, a driven roller 15, an intermediate transfer belt 16, and a plurality of primary transfer rollers 17. The intermediate transfer belt 16 is an endless belt extended by the drive roller 14, the driven roller 15 and a secondary transfer counter roller 35 so that the intermediate transfer belt 16 can travel in one direction. The primary transfer roller 17 is disposed at a position facing the photoconductor drum 10 of the process unit 9 via the intermediate transfer belt 16. Each of the primary transfer rollers 17 presses the inner face of the intermediate transfer belt 16 at the respective positions. A primary transfer nip is formed at a portion between the intermediate transfer belt 16 and the photoconductor drum 10 where the intermediate transfer belt 16 is pressed against the photoconductor drum 10.

Further, a secondary transfer roller 18 is disposed at a position facing a secondary transfer counter roller 35 via the intermediate transfer belt 16, in which the secondary transfer roller 18 presses the outer face of the intermediate transfer belt 16. A secondary transfer nip is formed between the secondary transfer roller 18 and the intermediate transfer belt 16 at a position where the secondary transfer roller 18 and the intermediate transfer belt 16 are in close contact.

A sheet feeding unit 5 is disposed at a lower part of the image forming apparatus 1. The sheet feeding unit 5 includes, for example, a sheet feed cassette 19 and a sheet feed roller 20. The sheet feed cassette 19 stores a sheet P used as a recording medium. The sheet feed roller 20 feeds the sheet P from the sheet feed cassette 19. The sheet P means one or more sheets.

Further, the image forming apparatus 1 includes a manual sheet feeding unit 50 in addition to the sheet feeding unit 5. The manual sheet feeding unit 50 includes, for example, a manual sheet feed tray 36, a manual sheet feed roller 37, a manual separation roller 38 and a manual sheet feed route 39. The manual sheet feed tray 36 is used to put the sheet P. The manual sheet feed roller 37 feeds the sheet P inside the apparatus. The manual separation roller 38 separates the sheet P one by one.

A sheet conveyance passage (path) 6 is a conveyance route to convey the sheet P fed from the sheet feeding unit 5 or the manual sheet feeding unit 50. In addition to a pair of registration rollers 21, a plurality of paired conveyance rollers are disposed along the sheet conveyance route 6 extending toward a sheet ejection unit 8.

The image forming apparatus 1 includes a fixing unit 7. The fixing unit 7 includes, for example, a fixing roller 22 and a pressure roller 23. The fixing roller 22 can be heated by a heater. The pressure roller 23 applies pressure to the fixing roller 22.

The sheet ejection unit 8 is disposed at the most downstream of the sheet conveyance route 6 of the image forming apparatus 1. The sheet ejection unit 8 includes, for example, paired sheet ejection rollers 24 and a sheet ejection tray 25. The paired sheet ejection rollers 24 eject the sheet P outside. The sheet ejection tray 25 is used to stack the ejected sheet P. Further, a bifurcating claw 31 is disposed for switching the sheet conveyance route 6 to an inverse sheet conveyance route 6a, to change a conveyance direction of the sheet P. A plurality of paired rollers is disposed on the inverse sheet conveyance route 6a to convey the sheet P.

A scanner unit 40, which can be used an image scanning unit, is disposed at the upper part of the image forming apparatus 1. The scanner unit 40 includes, for example, a first movement unit 41, a second movement unit 42, an imaging forming lens 43, an image scanner 44, and a scan-use glass 45. The first movement unit 41 and the second movement unit 42 are moveable inside the scanner unit 40. The imaging forming lens 43 is used to form an image using incident light. The image scanner 44 used as an image scanning device to scan contents on the sheet P. The scan-use glass 45 has an image-scan-use face, and the sheet P is placed on the image-scan-use face when the sheet P is scanned by the image scanner 44.

An automatic document feeder (ADF) 46 is disposed above the scanner unit 40. The ADF 46 automatically feeds the sheet P placed on a sheet table 47, and the scanner unit 40 scans image contents of the sheet P.

Further, the image forming device 2, the exposure unit 3, the transfer unit 4 can be collectively used as an image forming unit to form an image on the sheet P.

A description is given of a basic operation of the image forming apparatus 1 with reference to FIG. 1. As to the image forming apparatus 1, for example, image contents of a sheet scanned by the scanner unit 40.

At first, the sheet placed on the sheet table 47 is automatically fed to the scan-use glass 45 by the ADF 46, and the scanner unit 40 scans image information on the sheet. Further, while the ADF 46 is being opened, the image information of the sheet P placed on the scan-use glass 45 is scanned by the scanner unit 40.

Specifically, in the scanner unit 40, the first movement unit 41 and the second movement unit 42 move along a face of the sheet while a light source of the first movement unit 41 emits light to the sheet P and the first movement unit 41 receives reflection light from the sheet. The reflection light is further reflected to the second movement unit 42. Then, a mirror of the second movement unit 42 further reflects the reflection light to the image scanner 44 via the imaging forming lens 43. Then, the image scanner 44 scans the image information.

When an image forming operation is started, an electrostatic latent image is formed on the photoconductor drum 10 of each of the process units 9Y, 9C, 9M, 9Bk based on the above scanned image information. The exposure unit 3 exposes light corresponding to the image information to each of the photoconductor drums 10. The image information is prepared by decomposing a full color image to monochrome color image information of yellow, cyan, magenta and black. After the electrostatic latent image is formed on the photoconductor drum 10, the development roller 13 supplies toner contained in the developing device 12 onto the photoconductor drum 10 to develop the electrostatic latent image as a toner image or developed image.

In the transfer unit 4, the intermediate transfer belt 16 is moved along direction of an arrow A of FIG. 1 by driving the drive roller 14. Further, a constant voltage having a polarity opposite to toner charging polarity or a voltage having a controlled constant current is applied to the primary transfer roller 17. With this configuration, a transfer electric field is generated at the primary transfer nip, and the toner image formed on the photoconductor drum 10 is transferred onto the intermediate transfer belt 16 at the primary transfer nip, in which the toner images formed on the respective photoconductor drums 10 are sequentially superimposed one above the other to form a composite image on the intermediate transfer belt 16.

Further, when the image forming operation is started, in the sheet feeding unit 5, the sheet P having a size matched to the scanned image information is fed to the sheet conveyance route 6 from the sheet feed cassette 19 by driving the sheet feed roller 20. The sheet P fed to the sheet conveyance route 6 is conveyed to the secondary transfer nip set by the secondary transfer roller 18 and the secondary transfer counter roller 35 at a given timing by using the registration rollers 21. In this timing, a transfer voltage having a polarity opposite to the toner charging polarity of the toner images formed on the intermediate transfer belt 16 is applied to generate the transfer electric field at the secondary transfer nip. The toner images formed on the intermediate transfer belt 16 are collectively transferred onto the sheet P by the transfer electric field generated at the secondary transfer nip.

Further, the sheet P can be fed from the manual sheet feeding unit 50. Specifically, the sheet P placed on the manual sheet feed tray 36 is fed inside the apparatus by the manual sheet feed roller 37, and then the manual separation roller 38 separates the sheet P one by one, and feeds the sheet P to the manual sheet feed route 39. The end of the manual sheet feed route 39 is connected to the sheet conveyance route 6. The sheet P conveyed to the sheet conveyance route 6 from the manual sheet feed route 39 is conveyed to the secondary transfer nip at a given timing by using the registration rollers 21.

The sheet P transferred with the toner images is conveyed to the fixing unit 7. In the fixing unit 7, the fixing roller 22 and the pressure roller 23 apply heat and pressure to the sheet P to fix the toner images on the sheet P. Then, the sheet P having fixed the toner images is separated from the fixing roller 22, and then conveyed by the paired conveyance rollers to the sheet ejection unit 8. In the sheet ejection unit 8, the sheet P is ejected to the sheet ejection tray 25 by a sheet ejection roller 24.

Further, an image can be formed on both face of the sheet P. Specifically, when the sheet P is conveyed from the fixing unit 7 to the sheet ejection unit 8, the bifurcating claw 31 is rotated by a driver such as a solenoid to change the conveyance route of the sheet P to an inverse sheet conveyance route 6a.

Then, the sheet P is conveyed along the inverse sheet conveyance route 6a by paired rollers disposed for the inverse sheet conveyance route 6a, and then the sheet P reversing the face sides from the front face to the rear face is returned to the sheet conveyance route 6. Then, similar to the front face, an image is formed on the rear face of the sheet P. After fixing the image, the sheet P is ejected to the sheet ejection tray 25.

The above described image forming operation is used for forming a full color image on the sheet P but not limited hereto. For example, a monochrome image can be formed by using any one of the process units 9Y, 9C, 9M, 9Bk, and two or three color images can be formed by using two or three of the process units 9.

Figure 2:
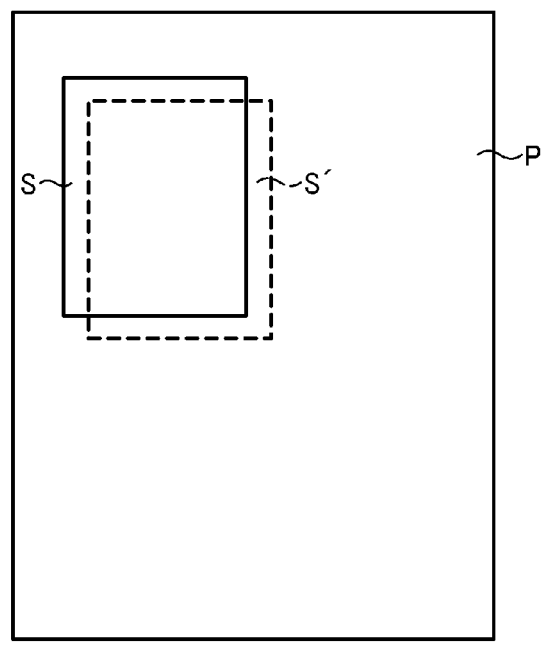
FIG. 2 is a schematic view of a sheet formed with an image deviated from a desired image position.

When the image forming apparatus 1 forms the image on the sheet P as above described, the image may be deviated from a desired image. For example, as indicated in FIG. 2, a position of an image S formed on the sheet P deviates from a position of desired image S'. This positional deviation of the image may be caused by a positional deviation and skew of the sheet P when the sheet P is conveyed along the sheet conveyance route, and/or distortion of the sheet P.

As to the image forming apparatus 1 of the first example embodiment, the positional deviation of image can be corrected by using an image scanning method using an image measurement sheet to be described later, in which an image formed on the sheet P is scanned, and then an image correction such as positional deviation correction is performed. Specifically, the image scanning method uses the image scanner 44 to scan the sheet P via the image measurement sheet to measure a position of the image formed on the sheet P, and then the positional deviation is corrected. A description is given of the image measurement sheet and the image scanning method of the first example embodiment.

Figure 3:
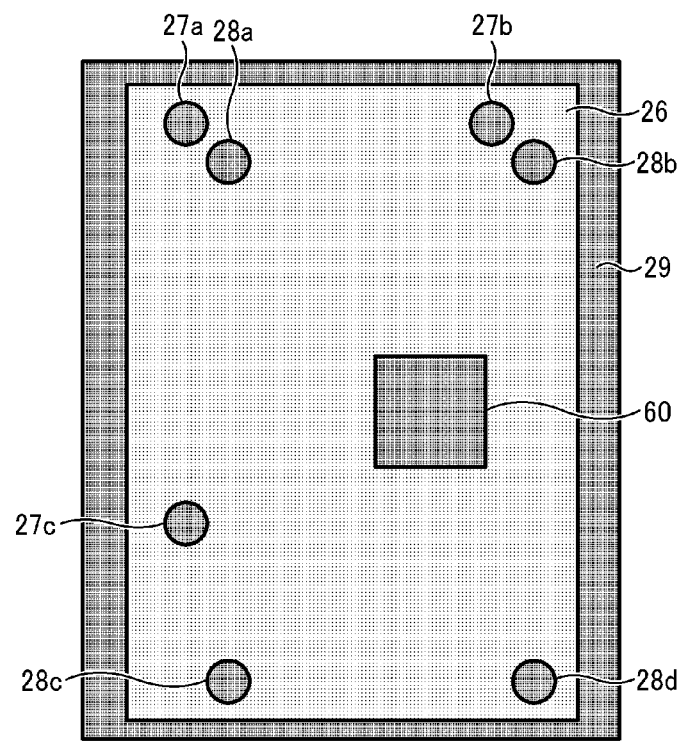
FIG. 3 illustrates an image measurement sheet of a first example embodiment.

FIG. 3 illustrates an image measurement sheet 26 used as a measurement reference sheet to measure an image formed on a sheet of the first example embodiment. As illustrated in FIG. 3, the image measurement sheet 26 has a plurality of recording medium scan windows 27 and a plurality of formed-image scan windows 28. For the simplicity of expression, the recording medium scan window 27 may be referred to the medium scan window 27, and the formed-image scan window 28 may be referred to the image scan window 28. For example, the image measurement sheet 26 has three medium scan windows 27a, 27b, 27c used as windows for detecting an end position of the sheet P used as a recording medium, and four image scan windows 28a, 28b, 28c, 28d used as windows for detecting a position of an image formed on the sheet P. Each of the medium scan windows 27 (27a, 27b, 27c) and the image scan windows 28 (28a, 28b, 28c, 28d) can be formed, for example, with a circle shape. Since the relative position among each of the windows formed on the image measurement sheet 26 is correctly calculated, a position of the sheet P and a position of image formed on the sheet P can be calculated based on the relative position among each of the windows, to be described later. Further, the image measurement sheet 26 has an information scan window 60 used for detecting imaging condition information 61 of the sheet P, to be described later. The medium scan window 27 can be a through hole or a transparent portion disposed with a transparent material so that the detection can be performed effectively through the window. The image scan window 28 can be a through hole or a transparent portion disposed with a transparent material so that the detection can be performed effectively through the window. The information scan window 60 can be a through hole or a transparent portion disposed with a transparent material so that the detection can be performed effectively through the window, and the information scan window 60 can be shaped into, for example, a rectangular shape.

The image measurement sheet 26 is made of material having smaller linear expansion coefficient to reduce the positional deviation of each of the windows due to temperature change. For example, the image measurement sheet 26 is made of a resin sheet such as polyethylene-terephthalate (PET) film having a thickness of 0.1 (mm) to 0.25 (mm). The image measurement sheet 26 can be made of different material in view of the use-environment, in which a plurality of the image measurement sheets 26 can be made.

In this description, a face placed on the scan-use glass 45 and scanned by the image scanner 44 can be referred to a front face of the sheet P and the image measurement sheet 26, and a face of the image measurement sheet 26 facing a backing member 29 can be referred to a rear face.

Figure 4:
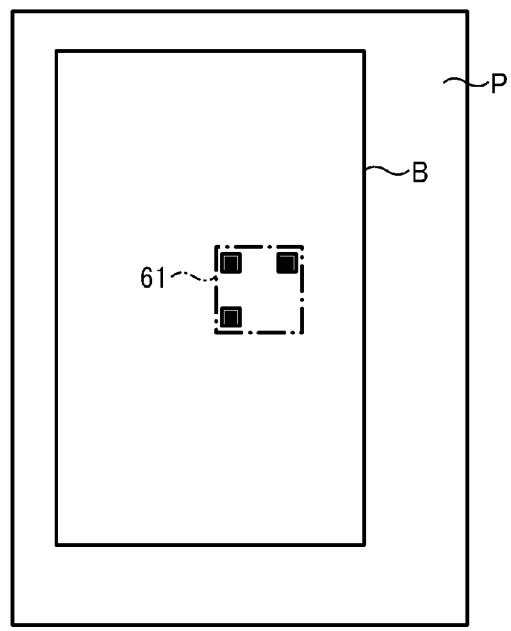
FIG. 4 illustrates a sheet printed with imaging condition information.

FIG. 4 illustrates an example of an image B and imaging condition information 61 formed on the sheet P used for the image correction process. Hereinafter, the image B used for the correction process may be referred to a correction-use image B and the sheet P used for the correction process may be referred to a correction-use sheet P. The imaging condition information 61 is, for example, one dimensional code such as bar code, and two dimensional code such as QR code (trademark). To be described later, the imaging condition information 61 includes information required for the image position correction such as printed date of image.

By employing one dimensional code such as bar code and two dimensional code such as QR code (trademark) as the imaging condition information 61, the imaging condition information 61 can be analyzed by using known software programs, and the image scanner 44 can scan the imaging condition information 61 to extract the recorded information.

Figure 5:
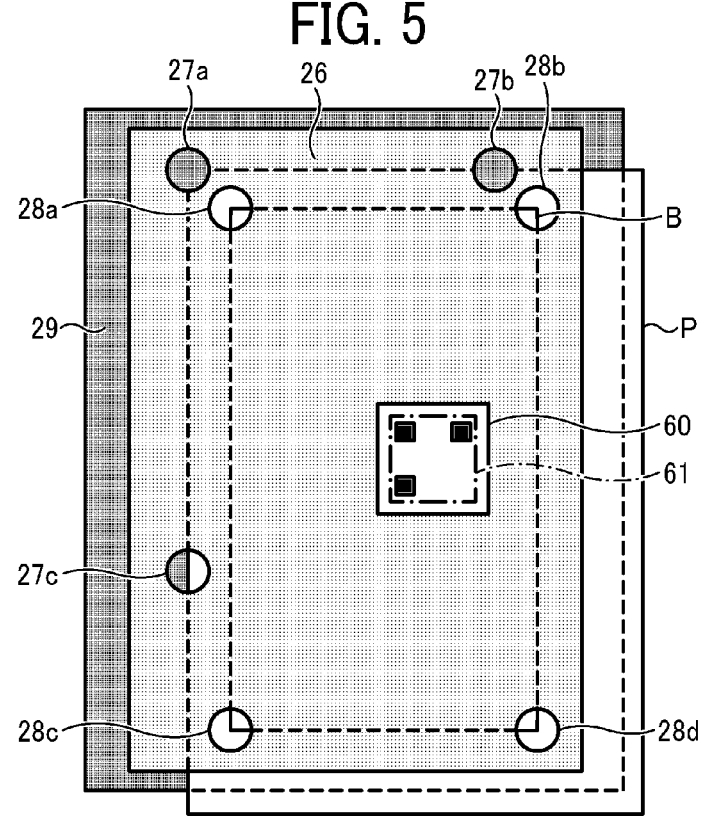
FIG. 5 illustrates a view that a sheet is placed between the image measurement sheet and a backing member.

As illustrated in FIG. 5, when an image scanning is performed by using the image measurement sheet 26, an operator such as a service person or a user places the sheet P between the image measurement sheet 26 and the backing member 29 by setting the sides and corners of the sheet P to the corresponding medium scan windows 27 of the image measurement sheet 26, which means the sheet P is sandwiched by the image measurement sheet 26 and the backing member 29. Further, as to FIG. 5, the image measurement sheet 26 faces the scan-use glass 45 of the image forming apparatus 1, and the backing member 29 faces the ADF 46 (see FIG. 1), in which the image measurement sheet 26 is placed between the sheet P and the image scanner 44.

When the operator places the sheet P between the image measurement sheet 26 and the backing member 29, the image measurement sheet 26 is overlaid and retained at a given position relative to the sheet P so that each of the medium scan windows 27 corresponds to each of sides and corner of the sheet P, and each of the image scan windows 28 corresponds to each of four corners of the image B. As indicated in FIG. 5, each of the medium scan windows 27 and the image scan windows 28 can be formed at suitable positions on the image measurement sheet 26 based on the size of the sheet P and the image B, which means the positions of the medium scan windows 27 and the image scan windows 28 on the image measurement sheet 26 can be changed depending on types of the sheet P to-be-scanned. The image scanner 44 can scan the ends of the sheet P such as sides and a corner of the sheet P through the medium scan windows 27, and the corners of the image B through the image scan windows 28.

Further, when the image measurement sheet 26 is set over the sheet P by corresponding the medium scan windows 27 to the sides and corner of the sheet P, and the image scan windows 28 to the corners of the image B, the information scan window 60 can be corresponded to the imaging condition information 61. Therefore, the image scanner 44 can scan the imaging condition information 61 printed on the sheet P through the information scan window 60. With employing this configuration, the image forming apparatus 1 can automatically acquire required information by scanning the imaging condition information 61, which means a separate manual information management of various information such as the image forming condition information by the operator is not required, and thereby the work load of the operator can be reduced. Further, compared to the manual operation and management of various information such as the image forming condition information, which may cause a data error by a manual input operation, the above described configuration of the example embodiment can prevent the data error. The information recorded as the imaging condition information 61 includes information related to the image forming condition used for the image forming.

For example, the imaging condition information 61 includes various recorded information such as printed date indicating a date that the image B and the imaging condition information 61 were printed on the sheet P. Therefore, even if the printed date of the image B becomes unknown, the printed date can be confirmed by scanning the sheet P. When a longer time elapses after the printed date of image, conditions of the image forming apparatus 1 and ambient temperature may change, and the image correction may not be performed correctly. However, since date management can be performed simply by scanning the imaging condition information 61, and the image correction can be performed correctly and precisely.

The imaging condition information 61 can further include identification (ID) information of the image forming apparatus 1 that has printed the image B and the imaging condition information 61. Therefore, when a plurality of the sheets P are printed with images by using a plurality of image forming apparatuses 1 and then users cannot identify which image forming apparatus 1 has printed which sheet P, the image forming apparatus 1 that has printed the image B can be identified automatically by scanning the identification (ID) information.

The imaging condition information 61 can further include information of the sheet P such as the brand or type, and size of the sheet P. Therefore, even if the brand and size of the sheet P becomes unknown, the brand and size of the sheet P can be confirmed by scanning the sheet P. Further, the positional correction can be performed automatically with a suitable condition based on the brand of the sheet P.

The imaging condition information 61 can further include information of temperature and humidity around the image forming apparatus 1 when the image B and the imaging condition information 61 were printed. Therefore, the positional correction can be performed automatically with a suitable condition based on the ambient temperature and humidity around the image forming apparatus 1 when the image B and the imaging condition information 61 were printed.

The imaging condition information 61 can further include information of setting values related to a position of image forming. Therefore, the image position forming can be corrected automatically based on a scanned image.

Second Example Embodiment

Figure 6:
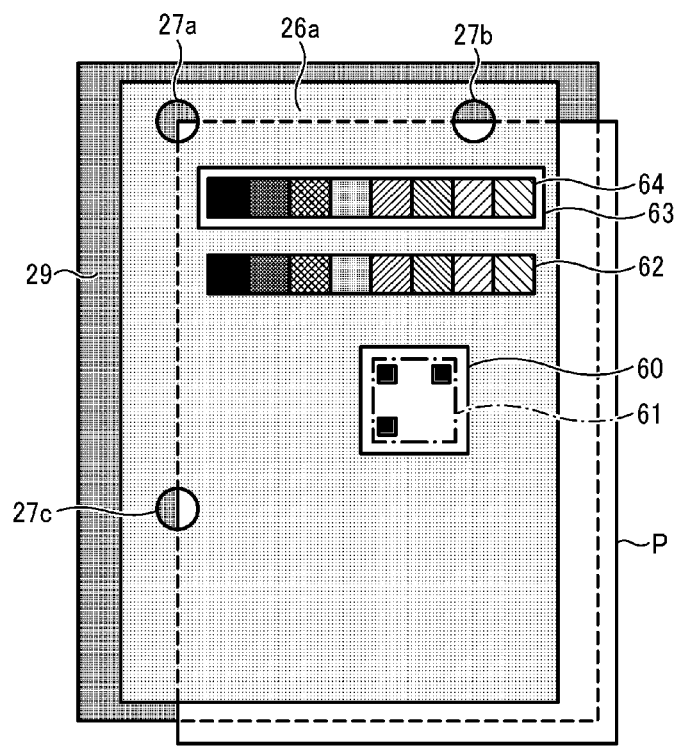
FIG. 6 illustrates an image measurement sheet of a second example embodiment.

A description is given of an image measurement sheet 26*a* of a second example embodiment with reference to FIG. 6. The image measurement sheet 26*a* can be used as a reference or standard when measuring the image density. The image density of an image formed on the sheet P can be corrected to a desired image density by performing the image measurement using the image measurement sheet 26*a*. The configuration of the image measurement sheet 26*a* similar or same as the configuration of the image measurement sheet 26 of the first example embodiment may not be described.

As illustrated in FIG. 6, the image measurement sheet 26*a* has, for example, a reference patch pattern 62 used as a reference image density pattern, and a density scan window 63. The density scan window 63 can be used as a window to scan the density of the image formed on the sheet P. A density pattern 64 having a plurality of density patterns formed on the sheet P can be scanned by the image scanner 44 through the density scan window 63. The density scan window 63 can be a through hole or a transparent portion disposed with a transparent material so that the detection can be performed effectively through the window, and the density scan window 63 can be shaped into, for example, a rectangular shape.

As to the second example embodiment, the image measurement sheet 26*a* is formed with the reference patch pattern 62, in which the density of each patch of the reference patch pattern 62 can be measured in advance, or can be measured by scanning the reference patch pattern 62 by using the image scanner 44. Further, the density pattern 46 formed on the sheet P is scanned through the density scan window 63 by using the image scanner 44. Then, the scanned density pattern 64 and the reference patch pattern 62 are compared. Based on the density comparison result, a deviation level of density between the scanned density pattern 64 and the reference patch pattern 62 (i.e., desired image density) can be calculated for each of the patches, and then the density of each of patches can be corrected.

The imaging condition information 61 includes information of setting values related to the image density when the image forming operation was performed. Based on the imaging condition information 61, each of the setting values can be changed automatically when the image density is corrected.

As to the above described first and second example embodiments, when the image correction is performed by using the image measurement sheet, the size deviation of the sheet P may become an issue. The size of the sheet P changes when amount of moisture included in the sheet P changes. Specifically, right after the printing of image on the sheet P, the size of the sheet P more likely deviates or fluctuates, and the size deviation affects the precision of the image correction. Therefore, the image correction is performed for the sheet P when a given time elapses after printing the image on the sheet P so that the image correction is performed under a condition that the amount of moisture in the sheet P becomes stable.

Figure 7:
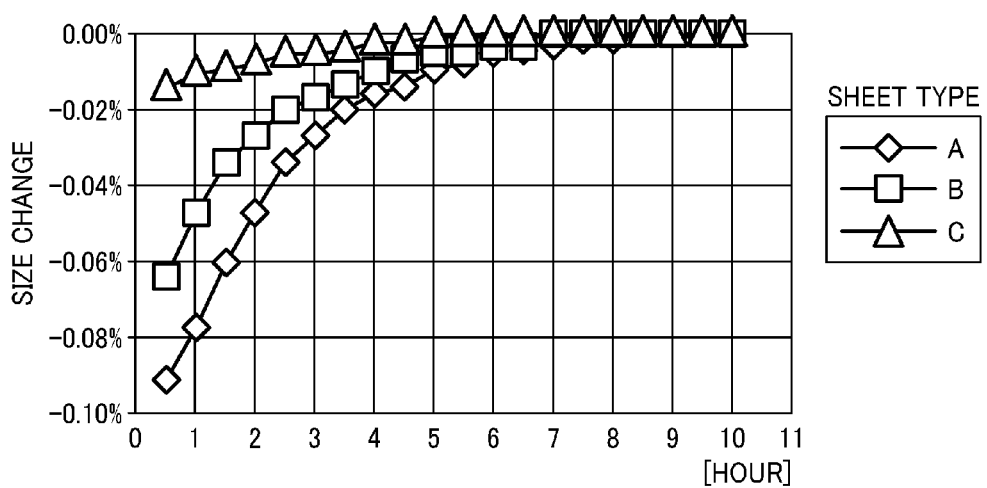
FIG. 7 illustrates profiles of sheet size change of different sheet brands right after an image forming operation.

FIG. 7 illustrates profiles of sheet size change of three different sheet brands A, B, and C right after the image forming operation, in which the horizontal axis represents the time, and vertical axis represents the size change ratio, and data was measured with one hour interval. The sheet basis weight was, for example, 80 gsm for the type A, 180 gsm for the type B, and 350 gsm for the type C.

As indicated in FIG. 7, the sheet size changes greatly for each of the types right after the image was printed, which means the sheet shrinks. Further, the greater the sheet basis weight, the smaller the size change ratio, and the greater sheet basis weight, the shorter the time to stabilize the sheet size.

Based on the result indicated in FIG. 7, the time required to stabilize the sheet size (hereinafter, quality-stabilized time) was set 10 hours for the type A, 8 hours for the type B, and 6 hours for the type C, and the image correction is performed when the quality-stabilized time elapses after the image was printed.

Further, when a longer time elapses after the image is printed on the sheet P, the condition of the image forming apparatus 1 and ambient temperature may change, and the image correction may not be performed correctly. Therefore, as to the first and second example embodiments, the image correction is performed to the sheet P within a given time period (e.g., 24 hours) after the image is printed on the sheet P.

The elapsed time management of the sheet P after the image was printed on the sheet P can be performed by scanning the information recorded or stored as the imaging condition information 61 on the sheet P. Based on the information recorded as the imaging condition information 61, the requirement of the image correction can be determined. Hereinafter, the process of image correction including the requirement determination of the image correction is described with reference to FIG. 8.

At first, the sheet P printed with the image B and the imaging condition information 61 is prepared. Then, the image scanner 44 (see FIG. 1) scans the end of the sheet P, the image B and the imaging condition information 61 printed on the sheet P to acquire information such as printed date of the image B and the type of the sheet P (steps S1 and S2), in which the data that the sheet P is scanned at step S1 can be also acquired.

If the time difference of the printed date scanned at step S1 and the data when the sheet P is scanned at step S1 is greater than a given time period such as 24 hours, which means that the sheet P is scanned at the date that is not within 24 hours after the printed date of the image B (S3: NO), the error is reported (step S30). If the error is reported, it is determined that the sheet P cannot be used for the image correction, and then it is automatically determined that the correction operation is not performed, and the sequence ends.

By contrast, if the time difference of the printed date scanned at step S1 and the data when the sheet P is scanned at step S1 is within the given time period such as 24 hours, which means that the sheet P is scanned at the date that is within the 24 hours after the printed date of the image B (S3: YES), the sequence proceeds to step S4. At step S4, it is determined whether the quality-stabilized time elapses after the printed date of image B. Since the quality-stabilized time (i.e., criteria time) may vary depending on the sheet type such as brand, and the coating of the sheet P such as coated or non-coated, information of the brand or the like is scanned from the imaging condition information 61 to determine the quality-stabilized time.

If the quality-stabilized time elapses for the scanned sheet P (S4: YES), it is determined automatically that the sheet P can be used for the image correction, and each of the condition setting values are calculated based on the information scanned from the imaging condition information 61 and the measured image information (step S5) so that the image correction can be performed by using the calculated condition setting values.

By contrast, if the quality-stabilized time does not elapse for the scanned sheet P, it is determined that the image correction is not performed automatically, an alarm report is informed to an operator (step S40), and a confirmation display is generated and displayed to request the operator to confirm whether the image correction is performed by using the sheet P even though the quality-stabilized time for the sheet P does not yet elapse (step S41), in which it is determined whether the image correction is performed with an alarmed condition. If the operator determines to perform image correction with the alarmed condition, each of the condition setting values are calculated (step S5) so that the image correction can be performed by using the calculated condition setting values.

Be performing the above described processes using the information of printed date recorded as the imaging condition information 61 on the sheet P, it is determined whether the sheet P within the given time period (e.g., 24 hours) after the image was printed can be used for the image correction. If it is determined that the sheet P can be used for the image correction, the correction of position and density of an image to be formed on a new sheet can be performed based on the temperature and humidity around the image forming apparatus 1 when the correction-use image B was formed that is acquired from the imaging condition information 61.

As to the above described example embodiments, based on the acquired information such as the image printed data and sheet type, the sheet P that is suitable for the image correction alone can be used. Further, the temperature and humidity around the image forming apparatus 1 when the correction-use image B was formed can be used for the image correction, with which the image can be corrected with an enhanced precision.

As to the above described example embodiments, the image forming apparatus 1 can automatically acquire the information required to determine whether the sheet P can be used for the image correction, and the information required for the image correction by scanning the imaging condition information 61 from the sheet P used for the correction, which means a separate manual information management of various information such as the image forming condition information by the operator is not required, and thereby the work load of the operator can be reduced. Further, compared to the manual operation and management of various information such as the image forming condition information, which may cause a data error by a manual miss-inputting or miss-recording operation, the above described configuration of the example embodiments can prevent the data error.

Figure 9A:
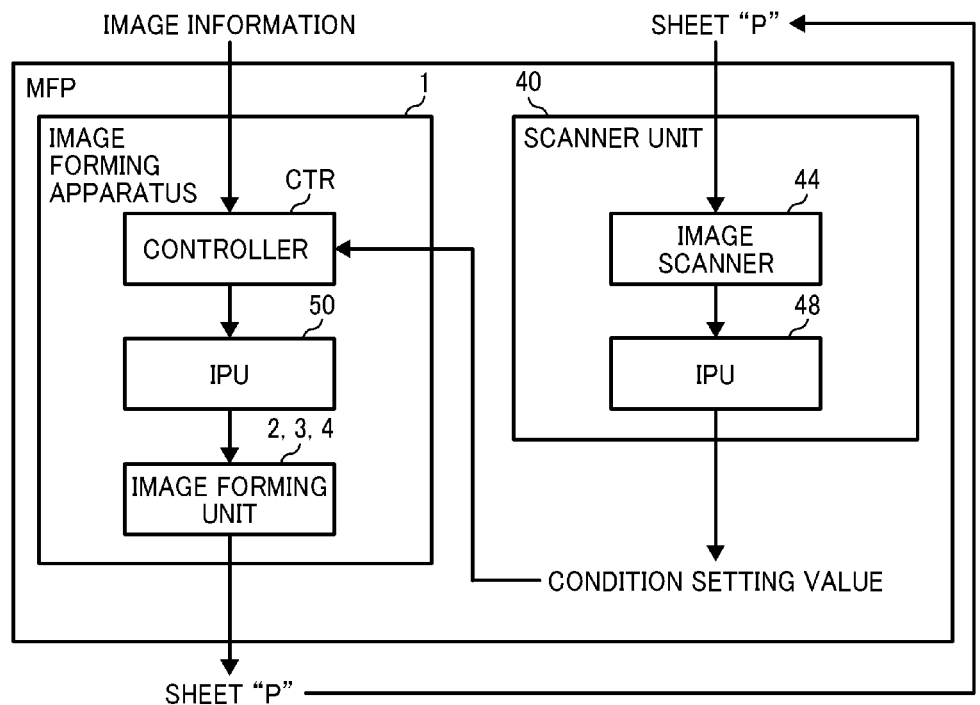
FIG. 9A is a block diagram of the image forming apparatus that performs information processing.

FIG. 9A is a block diagram of the image forming apparatus 1 that performs the above described processing, in which the image forming unit includes the image forming device 2, the exposure unit 3, and the transfer unit 4 to form an image on the sheet P based on the input image information. The image forming unit can print the correction-use image B and the imaging condition information 61 on the sheet P, with which the sheet P used for the image position correction and the image density correction can be prepared.

The sheet P printed with the correction-use image B and the imaging condition information 61 is scanned by the scanner unit 40 (see FIG. 1) before performing the image correction. Then, an image processing unit (IPU) 48 in the scanner unit 40 performs various correction processes such as noise removal and image resolution enhancement, in which the correction-use image B is analyzed and the imaging condition information 61 is scanned by using an analysis application.

Figure 9B:
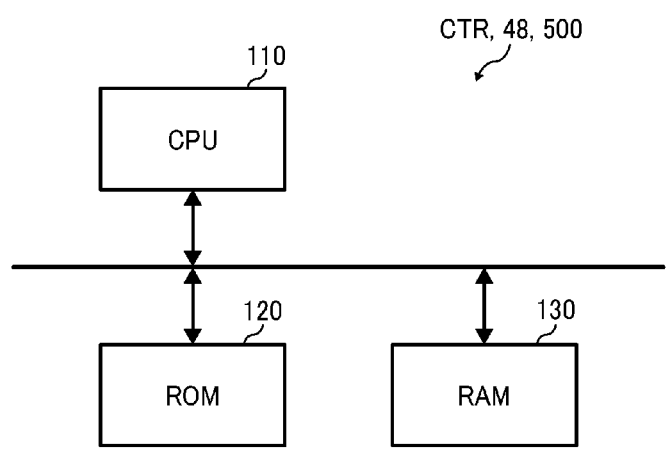
FIG. 9B is a hardware configuration of one or more controllers.

Then, based on the scanned information, the condition setting values to be used for the image correction are calculated, and then the condition setting values are input to a controller CTR of the image forming apparatus 1. Then, based on the condition setting values, an image processing unit (IPU) 500 in the image forming apparatus 1 performs the correction process such as the correction of light power and light emission timing of the exposure unit 3, and then an image applied with the corrected condition can be printed on a new sheet. Each of the controller CTR, IPU 48 and IPU 500 can be configured, for example, with a central processing unit (CPU) 110, a read only memory (ROM) 120 and a random access memory (RAM) 130 as illustrated in FIG. 9B.

The above described information processing can be performed by an information processing apparatus such as a personal computer having a computing capability. Specifically, suitable condition setting values calculated by the information processing apparatus can be input to the image forming apparatus 1 such as a printer. Further, as to the image forming apparatus 1 such as digital multifunctional peripherals (MFP) having the scanner unit 40, the image forming apparatus 1 can automatically perform the image measurement to set suitable condition setting values in the image forming apparatus 1.

A description is given of the image position correction using the image measurement sheet 26 (see FIG. 3) of the first example embodiment. Specifically, the medium scan windows 27 and the image scan windows 28 of the image measurement sheet 26 are used to measure a position of the sheet P formed with the image B, and then the image position correction is performed.

As illustrated in FIG. 5, when the operator places the sheet P between the image measurement sheet 26 and the backing member 29, each of the medium scan windows 27 can be corresponded to a portion of two sides and a corner defined by the two sides intersecting with each other, and each of the image scan windows 28 can be corresponded to the four corners of the image B. The image density of surface of the image measurement sheet 26, the image density of surface of the sheet P and the image density of surface of the backing member 29 are set differently so that boundaries of the image measurement sheet 26, the sheet P and the backing member 29 can be scanned correctly. For example, when the sheet P is white, the image measurement sheet 26 is set gray, and the backing member 29 is set black.

Figure 10:
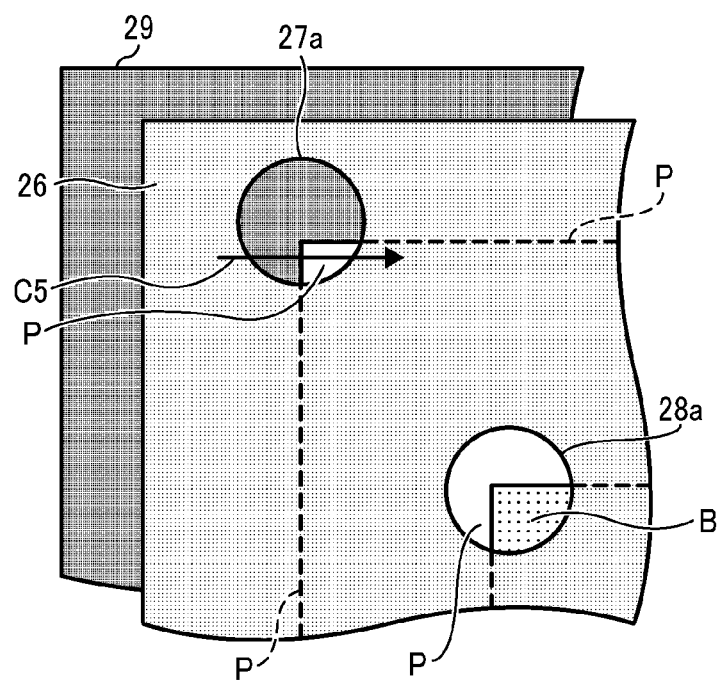
FIG. 10 is a schematic view of the image measurement sheet and the sheet when an image is scanned for measuring an image position.
Figure 11:
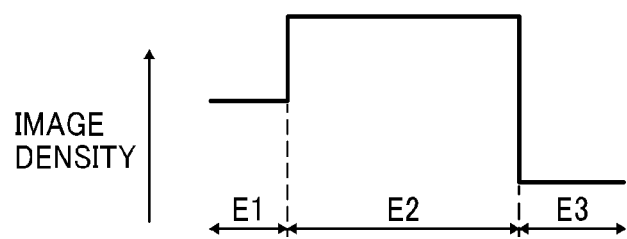
FIG. 11 is a schematic view of image density of the image measurement sheet and the sheet when an image is scanned for measuring an image position.

For example, as illustrated in FIG. 10, the image density measurement is performed along a direction of an arrow C5 (x-axis direction) by scanning an image at the medium scan window 27a by the scanner unit 40, and this image density measurement is performed for a plurality of lines while shifted along the y-axis direction. Then, as illustrated in FIG. 11, the image density E1 of the image measurement sheet 26, the image density E2 of background of the medium scan window 27a (i.e., image density of the backing member 29), and the image density E3 of the sheet P can be detected.

Figure 12:
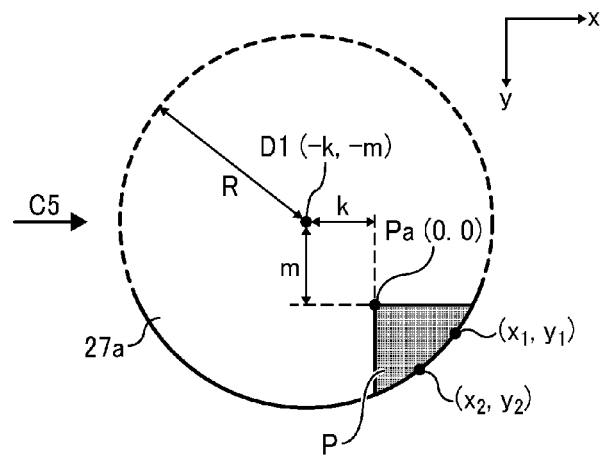
FIG. 12 is another schematic view of the image measurement sheet and the sheet when an image is scanned for measuring an image position.

By repeating the image density measurement along the direction of the arrow C5, as illustrated in FIG. 12, a portion of the sheet P appearing through the medium scan window 27a (a grayscale portion in FIG. 12) can be detected. However, at this timing, the existence of the portion of the sheet P in the medium scan window 27a can be detected, but the position of the portion of the sheet P (the grayscale portion in FIG. 12) in the medium scan window 27a is not yet detected. Therefore, the position of the sheet P relative to the medium scan window 27a is not detected.

Therefore, the position of the portion of the sheet P (the grayscale portion in FIG. 12) relative to the circle center D1 is calculated by performing the following processes, in which the circle center D1 is a point where the position is pre-determined. As indicated in FIG. 12, the coordinates of a corner Pa of the sheet P is set as the original point (0, 0), given points on the sheet P that cross the circumference of the medium scan window 27a are set as (x1, y1) and (x2, y2), the radius of the medium scan window 27a is pre-set as the radius R, and coordinates of the circle center D1 of the medium scan window 27a is set as (−k, −m). Since the given points (x1, y1) and (x2, y2) are on the circumference of the medium scan window 27a having the circle center D1 and the radius R, the value of (k, m) can be obtained by solving the following simultaneous equations. The following simultaneous equations can be set by substituting x1, x2 to x, and y1, y2 to y in $(x+k)^2+(y+m)^2=R^2$ $$(x1+k)^2+(y1+m)^2=R^2$$

$$(x2+k)^2+(y2+m)^2=R^2$$

With employing this processing, the coordinates of the circle center of the medium scan window 27a can be obtained, and the coordinates of the corner Pa of the sheet P relative to the medium scan window 27a can be calculated based on the image density measurement along one scanning direction alone.

Figure 13:
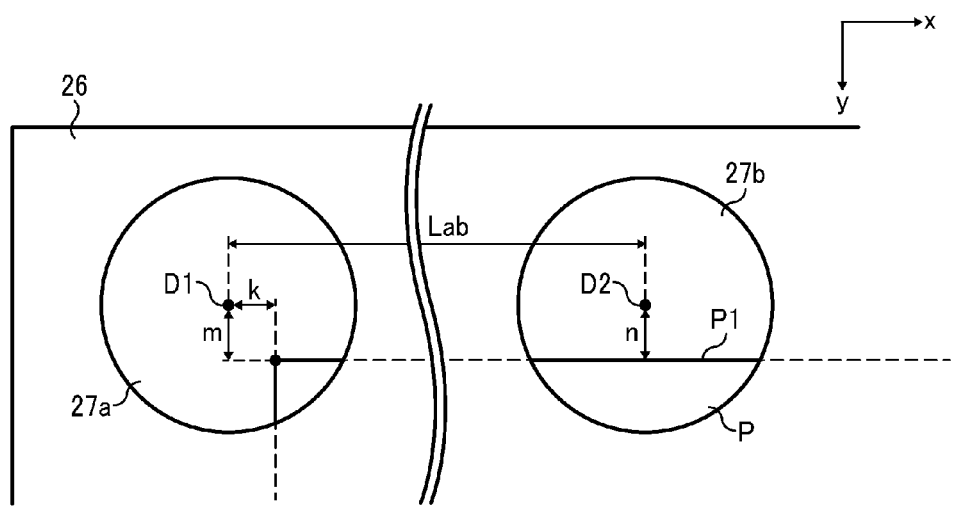
FIG. 13 is another schematic view of the image measurement sheet and the sheet when an image scanning is scanned for measuring an image position.

Further, as illustrated in FIG. 13, by performing the image density measurement for the medium scan window 27b along the x-axis direction for a plurality lines while shifting the image density measurement in the y-axis direction in FIG. 13, the vertical length "n" from the circle center D2 to the side end P1 of the sheet P, which is one side of the sheet P, can be obtained. For example, by performing the scanning along the vertical direction by passing through the circle center D2 (FIG. 13), the vertical length "n" can be obtained directly. Then, based on the horizontal length "Lab" between the circle center D1 of the medium scan window 27a and the circle center D2 of the medium scan window 27b, which is a pre-set value, and the above obtained vertical length "n," an inclination such as skew of the sheet P in the vertical direction relative to the image measurement sheet 26 can be obtained. Further, by performing the similar process for the medium scan window 27c, an inclination such as skew of the sheet P in the vertical direction relative to the image measurement sheet 26 can be obtained. With employing this processing, the position of the sheet P relative to the image measurement sheet 26 can be measured.

Figure 14:
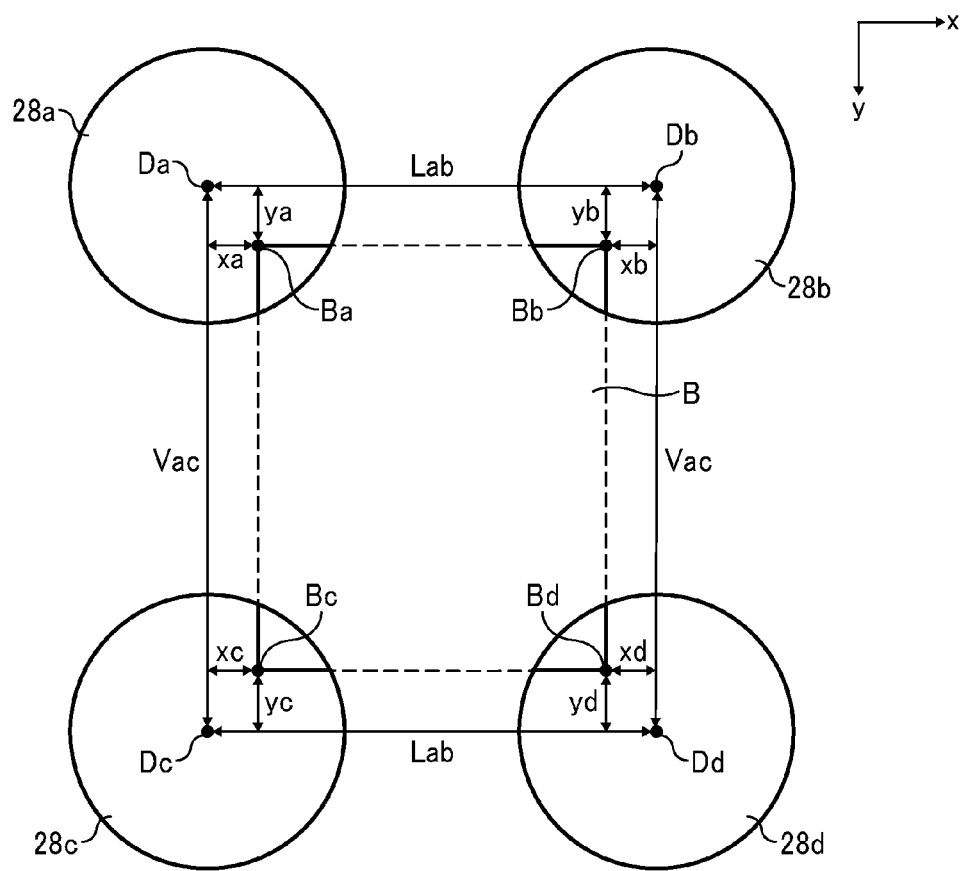
FIG. 14 is another schematic view of the image measurement sheet and the sheet when an image scanning is scanned for measuring an image position.

A description is given of a calculation method of the position and size of the image B by obtaining coordinates of the four corners of the image B with reference to FIG. 14. The image density measurement is performed along one direction for each of the image scan windows 28a to 28d, and the positional deviation level of the circle center of each of the image scan windows 28a to 28d and the four corners of the image B can be performed similar to the above described method of obtaining the (k, m) of the medium scan window 27a, and thereby the description of the image density measurement method and the positional deviation obtaining method are omitted.

As illustrated in FIG. 14, the four corners of the image B are set as corners "Ba, Bb, Bc, Bd," and the circle center of each of the image scan windows 28a, 28b, 28c, 28d are set as the circle centers "Da, Db, Dc, Dd," and the deviation level of the circle center "Da" relative to the corner "Ba" in the x-axis direction and the y-axis direction are respectively set as "xa" and "ya." Similarly, as illustrated in FIG. 14, the deviation levels of the circle centers "Db, Dc, Dd" and the corners "Bb, Bc, Bd" are respectively set as "xb, yb," "xc, yc," and "xd, yd."

As illustrated in FIG. 14, the four circle center points of the image scan windows 28a to 28d form a tetragon such as a rectangular shape. Therefore, the circle center Da and the circle center Db are set at the same position in the y-axis direction, the circle center Dc and the circle center Dd are set at the same position in the y-axis direction, the circle center Da and the circle center Dc are set at the same position in the x-axis direction, and the circle center Db and the circle center Dd are set at the same position in the x-axis direction.

Further, the length between the circle center Da and the circle center Db and the length between the circle center Dc and the circle center Dd are both set as "Lab," and the length between the circle center Da and the circle center Dc and the length between the circle center Db and the circle center Dd are both set as "Vac." In this processing, the positions of the circle centers "Da, Db, Dc, Dd" can be set at positions closer to the exact center positions, in which even if the sheet P is skewed for some levels, the image correction can be performed because the skew can be detected.

If the circle center Da is set as the original point (0, 0), the coordinates of each of the corners of the image B can be expressed as the corner Ba (xa, ya), the corner Bb (Lab-xb, yb), the corner Bc (xc, Vac-yc), and the corner Bd (Lab-xd, Vac-yd).

With employing this processing, the positions of the four corners of the image B relative to the circle center Da of the medium scan window 28a can be measured, and then the position of the image B relative to the image measurement sheet 26 can be measured. Further, by using the measurement result of the position of the image B relative to the image measurement sheet 26 and the above described measurement result of the position of the sheet P relative to the image measurement sheet 26, the position of the image B relative to the sheet P can be measured, with which the image correction can be performed to a new image to be formed on a new sheet, and the new image can be formed at a correct position on the sheet P. For example, the new image can be formed at the correct position on the sheet based on a shrinking level of sheet due to the change of temperature and humidity around the image forming apparatus 1 and a printing deviation.

Further, the measurement of the position of the image "B" relative to the sheet P can be performed with a simpler method as follows. For the simplicity of description, a method of calculating the positions of the four corners in the y-axis direction is described.

Specifically, as indicated in FIG. 13, it is assumed that the deviation of the side end P1 of the sheet P from the circle center D1 in the y-axis direction and the deviation of the side end P1 of the sheet P from the circle center D2 in the y-axis direction are respectively calculated as "m" and "n," with which the deviation of the side end P1 of the sheet P from the circle center D1 and the circle center D2 in the y-axis direction can be approximately obtained as $(m+n)/2$.

Figure 15:
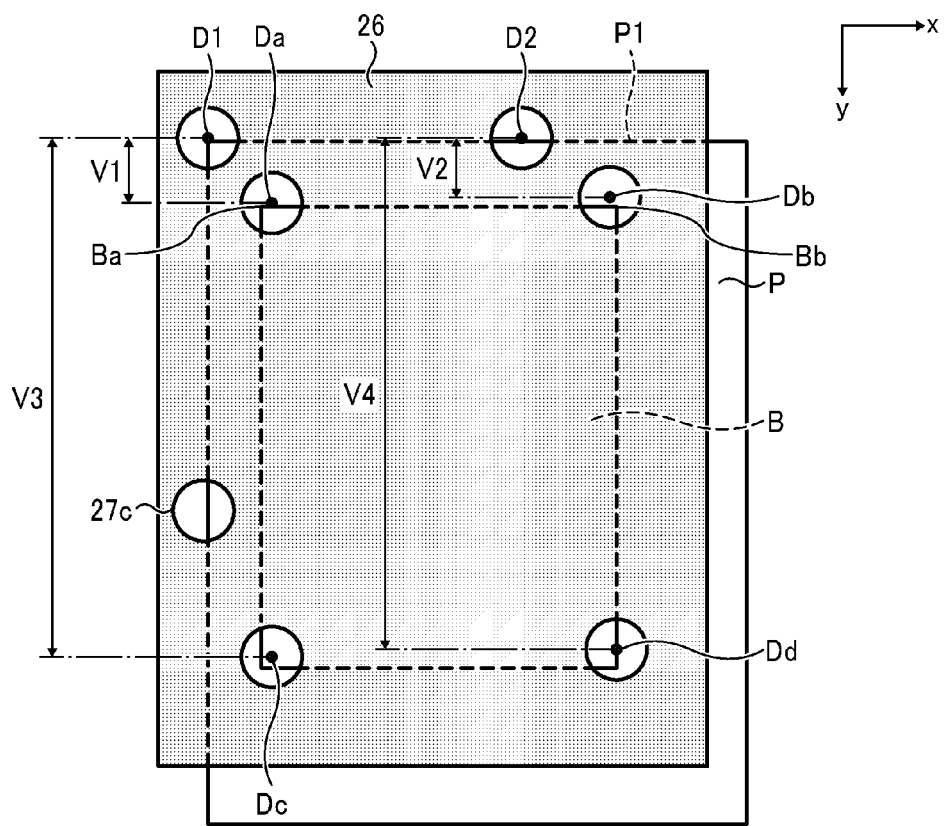
FIG. 15 is another schematic view of the image measurement sheet and the sheet when an image scanning is scanned for measuring an image position.

Then, when the vertical length from the circle center D1 to the circle center Da and the vertical length from the circle center D1 to the circle center Db are set as the vertical length V1, and the vertical length from the circle center D2 to the circle center Da and the vertical length from the circle center D2 to the circle center Db are set as the vertical length V2 as illustrated in FIG. 15, the vertical length from of the side end P1 of the sheet P to the corner Ba becomes "(length from D1 to Da)−(length from D1 to P1)+(length from Da to Ba)=V1−(m+n)/2+ya," and the vertical length from the side end P1 of the sheet P to the corner Bb becomes "V2−(m+n)/2+yb."

Since the positions of the medium scan windows 27 and the image scan windows 28a to 28d are calculated correctly in advance, and the vertical length V1 and the vertical length V2 are known values, the vertical length from the side end P1 of the sheet P to the corner Ba and the vertical length from the side end P1 of the sheet P to the corner Bb can be obtained.

Further, similarly, when the vertical length from the circle center D1 to the circle center Dc and the vertical length from the circle center D1 to the circle center Dd are set as the vertical length V3, and the vertical length from the circle center D2 to the circle center Dc and the vertical length from the circle center D2 to the circle center Dd are set as the vertical length V4, the vertical length from the side end P1 of the sheet P to the corner Bc becomes "V3−(m+n)/2+yc," and the vertical length from the side end P1 of the sheet P to the corner Bd becomes "V4−(m+n)/2+yd."

Since the vertical length V3 and the vertical length V4 are known values, the vertical length from the side end P1 of the sheet P to the corner Bc and the vertical length from the side end P1 of the sheet P to the corner Bd can be obtained.

With employing the above described processing, the vertical length from the end of the sheet P to the four corners of the image B can be obtained. Further, similarly, the horizontal length from one end of the sheet P to the four corners of the image B can be obtained. Further, since the positional relationship of the end of the sheet P and the image measurement sheet 26 is already known as above described, the positional relationship between the image measurement sheet 26, the sheet P, and the image B can be respectively calculated, with which the position of an new image to be formed on a new sheet can be corrected.

The above described image forming apparatus 1 is not limited to a color image forming apparatus of FIG. 1, but the image forming apparatus 1 can be a monochrome image forming apparatus, a copier, a printer, a facsimile machine or a multi-functional peripherals including these capabilities.

Further, the above described medium scan window 27 and the medium scan window 28 of the image measurement sheet 26 are formed as a circle shape hole, but not limited hereto. For example, the medium scan window 27 and the medium scan window 28 of the image measurement sheet 26 can be formed as a rectangular shape hole, in which by performing the image density measurement along the direction indicated by the arrow C5 and along the upper-to-lower direction in FIG. 10, the end of the sheet P and the end of the image B can be measured respectively, and the position of the corner of the sheet P and the corner of the image B can be measured.

Further, a configuration omitting the backing member 29 can be devised. In this case, the image density of the sheet P and the image density of the image measurement sheet 26 are required to be different from the image density of a background that is scanned.

Further, the image measurement sheet can include both of the medium scan window 27 and the medium scan window 28 of the first example embodiment (see FIG. 3), and the reference patch pattern 62 and the density scan window 63 of the second example embodiment (see FIG. 6), and the image measurement sheet including both of the medium scan window 27 and the medium scan window 28 of the first example embodiment and the reference patch pattern 62 and the density scan window 63 of the second example embodiment can be used as a reference sheet for measuring the image position, image size, and image density.

As to the above described example embodiments, by using the image measurement sheet, information of condition setting values used for the image forming operation can be managed with a simple method, and the correction of the image formed the recording medium can be implemented precisely.

As to the above described example embodiments, the image measurement sheet has the information scan window, through which the image forming condition that was used and recorded on the sheet when forming the image can be scanned. Therefore, when the image correction is performed, the image forming condition information can be acquired by scanning the recording medium, which means the manual operation and management of the image forming condition information is not required, and thereby the operator can perform the image correction with a simple method.

Numerous additional modifications and variations for the communication terminal, information processing system, and information processing method, a program to execute the information processing method by a computer, and a storage or carrier medium of the program are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

As described above, the present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

What is claimed is:

1. An image forming apparatus comprising:
   an image forming unit to form an image on a recording medium;
   an image scanning device to scan the image formed on the recording medium by overlaying an image measurement sheet on the recording medium formed with the image and through a plurality of image scan windows of the image measurement sheet, and to scan imaging condition information recorded on the recording medium by overlaying the image measurement sheet on the recording medium and through an information scan window of the image measurement sheet; and
   circuitry to compute an image correction condition based on the image and the imaging condition information scanned by the image scanning device, the image correction condition to be applied to a next image forming operation.

2. The image forming apparatus of claim 1, wherein the imaging condition information includes a date information indicating a date when the image is formed on the recording medium, and the circuitry determines whether the image correction is to be performed based on the date information.

3. The image forming apparatus of claim 2, wherein when the circuitry determines that the image correction is not performed based on the date information, the circuitry instructs a display to display a message for requesting a confirmation whether the image correction is to be performed.

4. The image forming apparatus of claim 1, wherein the image measurement sheet includes a reference image density pattern and a density scan window, wherein when the image scanning device scans the reference image density pattern on the image measurement sheet and an image density pattern formed on the recording medium through the density scan window, the circuitry compares the reference image density pattern and the image density pattern scanned by the image scanning device to correct a density of image to be formed by a next image forming operation.

5. A method of determining a condition of an image formed on a recording medium, the method comprising:
   scanning the image formed on the recording medium, and imaging condition information including a date information indicating a date when the image is formed on the recording medium, the image condition information being recorded on the recording medium, by overlaying an image measurement sheet on the recording medium and through a plurality of image scan windows and an information scan window of the image measurement sheet;
   comparing the date information indicating the date when the image is formed on the recording medium and another date information corresponding to a date when the image is scanned at the scanning step;
   determining whether a time difference of the date information indicating the date when the image is formed on the recording medium and the another date information corresponding to the date when the image is scanned at the scanning step is greater than a given time period; and
   performing an image correction when the time difference is within the given time period.

6. The method of claim 5, further comprising:
   checking whether a quality-stabilized time for stabilizing a size of the recording medium elapses when the determining step determines that the time difference is within the given time period;
   performing the image correction when a result of the checking step indicates that the quality-stabilized time elapses; and
   displaying a message of requesting a confirmation whether the image correction is to be performed when a result of the checking step indicates that the quality-stabilized time does not elapse.

* * * * *